(12) United States Patent
Urban et al.

(10) Patent No.: US 10,051,332 B2
(45) Date of Patent: Aug. 14, 2018

(54) TRANSMISSION OF VIDEO SIGNALS

(71) Applicant: Comcast Cable Communications, LLC, Philadelphia, PA (US)

(72) Inventors: David Urban, Downingtown, PA (US); Jorge Salinger, West Palm Beach, FL (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/460,645

(22) Filed: Mar. 16, 2017

(65) Prior Publication Data

US 2017/0353771 A1 Dec. 7, 2017

Related U.S. Application Data

(63) Continuation of application No. 13/892,708, filed on May 13, 2013, now Pat. No. 9,648,392, which is a
(Continued)

(51) Int. Cl.
*H04N 21/436* (2011.01)
*H04N 21/61* (2011.01)
(Continued)

(52) U.S. Cl.
CPC ..... *H04N 21/6106* (2013.01); *H04N 21/4122* (2013.01); *H04N 21/431* (2013.01); *H04N 21/436* (2013.01); *H04N 21/4363* (2013.01); *H04N 21/43615* (2013.01); *H04N 21/43637* (2013.01); *H04N 21/4402* (2013.01); *H04N 21/44227* (2013.01); *H04N 21/472* (2013.01);
(Continued)

(58) Field of Classification Search
CPC .......... H04N 21/436; H04N 21/43615; H04N 21/4363; H04N 21/43637
See application file for complete search history.

(56) References Cited

U.S. PATENT DOCUMENTS 5,729,281 A * 3/1998 Utsumi ................. H04H 20/38
348/E7.069
5,949,643 A 9/1999 Batio
(Continued)

FOREIGN PATENT DOCUMENTS

WO 2009061644 A1 5/2009

OTHER PUBLICATIONS

International Search Report, PCT Application No. PCT/US2008/081500, dated Jan. 2, 2009, 1 page.
(Continued)

*Primary Examiner* — Robert J Hance
(74) *Attorney, Agent, or Firm* — Banner & Witcoff, Ltd.

(57) ABSTRACT

An apparatus, method, and system are described for transmitting a television program signal. A portion of a local frequency spectrum may be determined to be free, or relatively unused. A user selection of a television program or broadcast programming channel may be received from a program lineup in an electronic programming guide. The selected program may be selected from a gateway, translated, and transmitted over the portion of the frequency spectrum determined to be free. The translation may include converting a signal from the gateway into a National Television Systems Committee (NTSC) signal or a mobile TV signal.

20 Claims, 8 Drawing Sheets

Related U.S. Application Data continuation of application No. 12/904,380, filed on Oct. 14, 2010, now Pat. No. 8,468,568.

(51) Int. Cl.

| | | |
|---|---|---|
| *H04N 21/431* | (2011.01) | |
| *H04W 16/14* | (2009.01) | |
| *H04N 21/4363* | (2011.01) | |
| *H04N 21/4402* | (2011.01) | |
| *H04N 21/442* | (2011.01) | |
| *H04N 21/41* | (2011.01) | |
| *H04N 21/482* | (2011.01) | |
| *H04N 21/472* | (2011.01) | |

(52) U.S. Cl.
CPC ....... *H04N 21/482* (2013.01); *H04N 21/4821* (2013.01); *H04W 16/14* (2013.01); *H04N 21/4126* (2013.01)

(56) References Cited

U.S. PATENT DOCUMENTS

| | | | |
|---|---|---|---|
| 6,195,797 B1* | 2/2001 | Williams, Jr. | H04L 29/06 348/492 |
| 6,202,211 B1* | 3/2001 | Williams, Jr. | H04L 29/06027 348/E7.05 |
| 6,622,307 B1* | 9/2003 | Ho | H04N 7/104 348/E7.05 |
| 6,981,045 B1* | 12/2005 | Brooks | H04L 29/06027 348/E7.073 |
| 7,027,716 B1 | 4/2006 | Boyle et al. | |
| 2002/0066101 A1 | 5/2002 | Gordon et al. | |
| 2002/0138837 A1 | 9/2002 | Fries et al. | |
| 2003/0122966 A1 | 7/2003 | Markman et al. | |
| 2003/0151621 A1 | 8/2003 | McEvilly et al. | |
| 2003/0218613 A1 | 11/2003 | Yamamura et al. | |
| 2004/0031058 A1 | 2/2004 | Reisman | |
| 2004/0068755 A1 | 4/2004 | Davies et al. | |
| 2004/0117831 A1* | 6/2004 | Ellis | H04N 5/44543 725/53 |
| 2004/0117845 A1 | 6/2004 | Karaoguz et al. | |
| 2004/0261110 A1 | 12/2004 | Kolbeck et al. | |
| 2005/0028208 A1 | 2/2005 | Ellis et al. | |
| 2005/0240960 A1 | 10/2005 | Nagtzaam | |
| 2006/0048195 A1 | 3/2006 | Jutzi et al. | |
| 2006/0270340 A1 | 11/2006 | Pugel et al. | |
| 2007/0079340 A1 | 4/2007 | McEnroe | |
| 2007/0107019 A1 | 5/2007 | Romano et al. | |
| 2007/0136778 A1 | 6/2007 | Birger et al. | |
| 2007/0157240 A1 | 7/2007 | Walker | |
| 2007/0220547 A1* | 9/2007 | Teskey | H04N 7/106 725/39 |
| 2007/0250900 A1* | 10/2007 | Marcuvitz | H04L 12/2838 725/141 |
| 2008/0022324 A1* | 1/2008 | Yang | H04L 12/2838 725/81 |
| 2008/0235731 A1* | 9/2008 | Bryant | H04N 5/44543 725/44 |
| 2009/0276813 A1* | 11/2009 | Bleiweiss | H04N 19/115 725/82 |
| 2010/0100915 A1* | 4/2010 | Krikorian | H04L 29/06027 725/109 |
| 2010/0175086 A1 | 7/2010 | Gaydou et al. | |
| 2010/0175101 A1* | 7/2010 | Devictor | H04N 21/236 725/131 |
| 2010/0186034 A1* | 7/2010 | Walker | H04N 21/4334 725/40 |
| 2010/0195667 A1 | 8/2010 | Wang et al. | |
| 2012/0017248 A1* | 1/2012 | Du Val | H04B 1/034 725/81 |

OTHER PUBLICATIONS

International Searching Authority, Written Opinion, PCT Application No. PCT/US2008/081500, dated Jan. 2, 2009, 5 pages.
Supplementary European Search Report, EP Application No. 08847156.0, dated Mar. 10, 2011, 129 pages.
EP Office Action, EP Application No. 08847156.0 dated Nov. 10, 2011, 6 pages.
European Search report—EP Application 11185211.7—Dated Mar. 6, 2015.
Response to European Partial Search Report—EP 11185211.7—Dated May 6, 2015.
European Extended Search Report—EP 11185211.7—Dated Jun. 3, 2015.
Response to European Office Action—EP Appl. 11185211.7—submitted Dec. 30, 2015.
European Office Action—EP Appl. 11185211.7—dated Mar. 29, 2016.
European Summons to Oral Proceedings, EP Application No. 11185211.7, dated Dec. 14, 2016.
European Decision to Refuse, EP Application No. 11185211.7, dated Jun. 12, 2017.
Aug. 7, 2017—Canadian Office Action—2,755,062.

* cited by examiner

TRANSMISSION OF VIDEO SIGNALS

This application is a continuation of and claims priority to U.S. patent application Ser. No. 13/892,708, filed May 13, 2013, which is a continuation of U.S. patent application Ser. No. 12/904,380, filed Oct. 14, 2010, and issued as U.S. Pat. No. 8,468,568, the contents of each of which are incorporated herein by reference in their entirety.

FIELD OF ART

The features described herein generally relate to providing users with access to content over a network. More specifically, aspects of the disclosure describe wireless transmission of video content.

BACKGROUND

Since its introduction, viewing video content on a television (TV) has become an integral part of our lives, and advances in electronics technology have further cemented this relationship. The availability of advanced devices and programming options, such as digital transmission, interactive set-top boxes (STBs) or gateways, and on-demand content, has given viewers more options now than ever before. Digital video recorders (DVRs) allow users to store content for later viewing, which further increases viewer demand for content. Portable media devices, such as cell phones, mobile TVs, personal data assistants (PDAs), and laptop computers, have allowed viewers to view content at a variety of locations using a variety of network connections.

Growing variety of product and service offerings has led to a growing demand being placed on the infrastructure that supports such services, and there will always be a demand for more features, greater convenience, and simpler ease of use. Viewers continue to seek a better viewing and interactive experience.

SUMMARY

This summary is not intended to identify critical or essential features of the disclosure provided herein, but instead merely summarizes certain features and variations thereof.

A gateway device in a viewer's home may receive digital video content (which can include video, audio, and other data), such as an Internet Protocol (IP) TV content stream, and may give the viewer the option of having that content retransmitted wirelessly for reception on another device within the home, such as another television, computer, mobile device, etc. The local retransmission may use a whitespace transmitter to identify and use wireless channels (e.g., UHF or VHF channels) for the wireless retransmission, and may also involve recoding and/or converting the program from an original format or modulation to a different format or modulation suitable for a destination device.

In some embodiments, local unused whitespace channels can be correlated to specific devices (e.g., televisions) within the home, and those channels can be used in a dedicated manner to deliver video content to those devices, allowing the devices to receive targeted video. The channels may be use in conjunction with a wireless remote control (e.g., an RF remote), allowing users of legacy televisions to enjoy an interactive viewing experience on an analog television, by having the television receive video signals wirelessly using its legacy wireless components, and providing user commands through the RF remote.

In some embodiments, the user may be given the option of choosing the wireless channel, or the target television, for a program selected from an onscreen electronic program guide (EPG). The option may include listing assigned channels with user-assigned names, and allowing the user to indicate which channels should be used to transmit the selected program.

Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
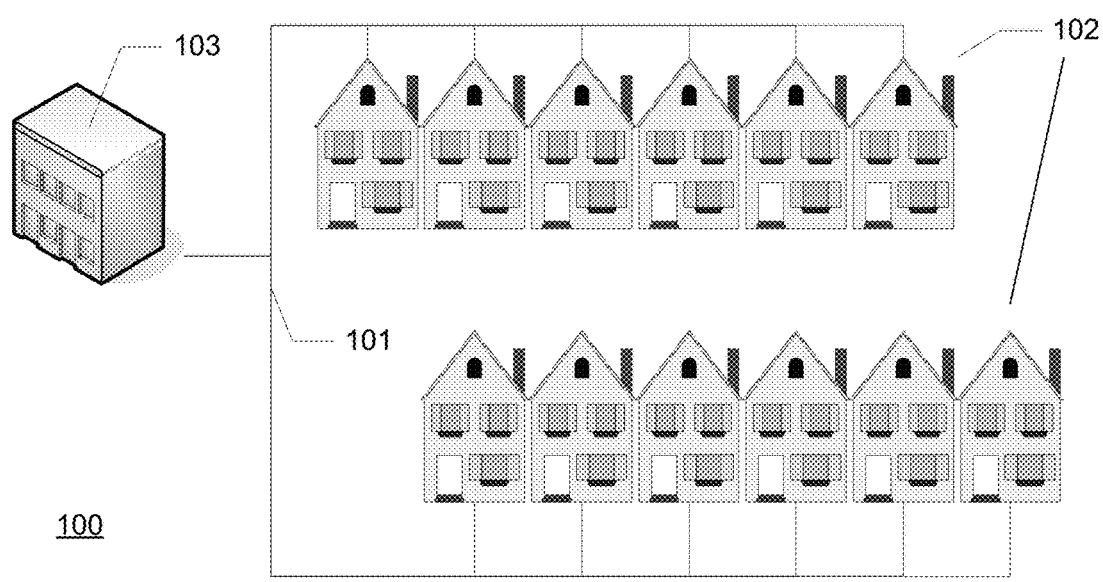
FIG. 1 illustrates an example information distribution network, such as a video content distribution network.

FIG. 1 illustrates an example information distribution network 100 on which many of the various features described herein may be implemented. Network 100 may be any type of information distribution network and may use any medium, such as satellite, optical fiber, telephone, cellular, wireless, etc. One example may be an optical fiber (e.g., fiber to the home), satellite (e.g., direct or digital broadcast), or a hybrid fiber/coax (HFC) distribution network found in many data and video content access/distribution networks. Such networks 100 may use a series of interconnected communication lines 101 (e.g., coaxial cables, optical fiber, etc.) to connect multiple premises 102 (e.g., homes, businesses, etc.) to a content provider's facility, such as a central office or headend 103. The central office 103 may transmit downstream information signals onto the lines 101, and each premises 102 may have a device such as a tuner used to receive and process those signals.

For example, there may be one line 101 originating from the central office 103, and it may be split a number of times to distribute signals to various premises 102 in the vicinity (which may be many miles) of, or being served by, the central office 103. The lines 101 may include components not illustrated, such as splitters, filters, amplifiers, etc. to help convey the signal clearly. As discussed above, portions of the lines 101 may also be implemented with fiber-optic cable, resulting in a hybrid fiber/cable network of lines 101. By running fiber optic cable, signal degradation in those portions may be significantly minimized, allowing a single central office 103 to reach even farther with its network of lines 101 than before.

Figure 2:
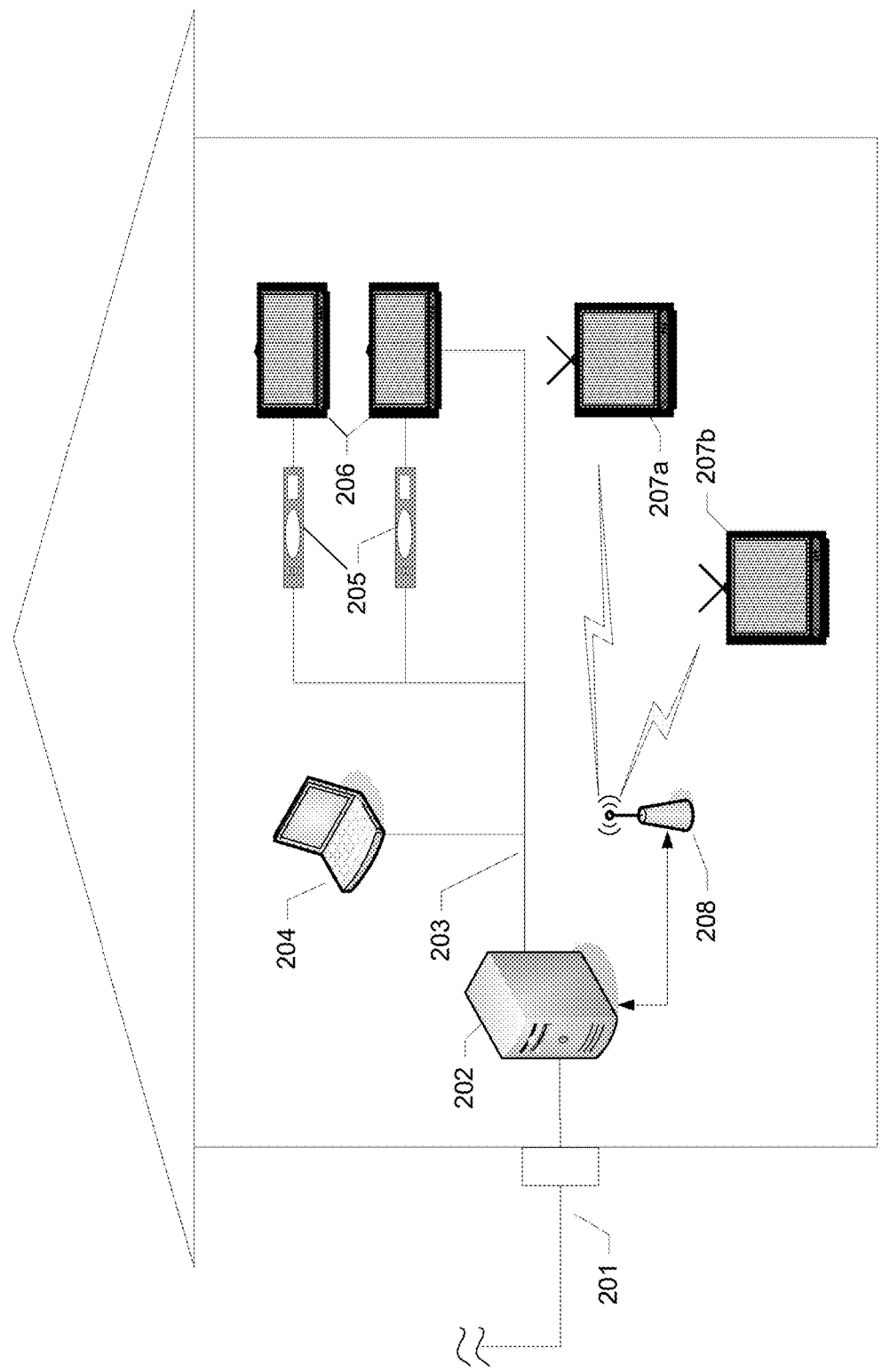
FIG. 2 illustrates an example network in one of the premises illustrated in the FIG. 1 network.

FIG. 2 illustrates a closer view of one of the premises (e.g., homes) 102 from FIG. 1. As illustrated, the premises may be connected to the network 101 by, for example, a communication link, such as an optical fiber, wireless, or coaxial cable 201. The link may be connected (e.g., directly or indirectly, wired or wireless, etc.) to a gateway device 202, which may serve as an interface between devices within the premises 102, and the external devices out on the network 101. The gateway 202 may include tuners, modulators, demodulators, etc. to communicate out on the network 101, and may also include interface components to communicate with the devices in the premises. Examples of the gateway 202 are discussed further below with respect to FIG. 6.

As for the network 203 in the premises, the specific types of components and communication media may vary, depending, for example, on the type of communication network used in the premises. One example may be an Internet Protocol network 203 carried over the premises' internal coaxial wiring under the MoCA (Multimedia Over Coax Alliance) standard. To this end, the gateway 202 may be an IP transport gateway, using IP communications to communicate with the devices in the premises, and with devices outside the premises (e.g., in an HFC network, via a DOCSIS CMTS). Other networks, such as optical fiber or wireless networks or portions of networks, may alternatively, or in combination, be used.

Various devices may communicate on a network 203 in the premises. For example, one or more personal computers 204 may use the gateway 202 to communicate with other devices on the Internet or an intranet (or another local network). Video and data content receivers 205 such as television set-top boxes (STB), digital video recorders (DVR), or integrated display devices 206 may receive distribution (e.g., IP distribution) of video content received at the gateway 202, and may convert that video content into a format suitable for display on corresponding video display devices, such as televisions or smartphones 206. For example, the devices 205 may receive an MPEG2 stream of video, and may process that stream to generate an HDMI (High Definition Multimedia Interface) output signal to each corresponding television 206. The receiver 205 may, of course, be a transceiver to allow and support interactive two-way communications.

Some televisions in the premises or home, however, might not have their own receiver 205. Or they might not have the circuitry needed to decode, for example, the MPEG2 stream of video received at the gateway 202. For example, televisions 207a and 207b might be legacy devices, such as old-fashioned analog televisions, having tuners configured to tune to the analog broadcast channels defined by the NTSC (National Television System Committee). Or they may be digital televisions not equipped to receive and decode the latest form of digital compression or modulation used or available on the network 101. To support such legacy devices, the gateway 202 may include a local wireless transmitter 208 (which may be a transceiver, with reception and transmission circuitry, and additional whitespace circuitry to identify unused channels in the transmitter's vicinity).

The local wireless transmitter 208 may be configured to transmit, e.g., broadcast, a low-power radio frequency channel carrying selected video and/or data content for local reception within the home. For example, if the television 207a is an analog television, the gateway 202 may use the transmitter 208 to transmit a selected program as an NTSC video signal on an NTSC Channel (e.g., channel 2). That channel and signal can be tuned by the television 207a, and displayed for the user's consumption. In this manner, legacy devices may continue to be used even if transmission techniques advance.

Figure 3:
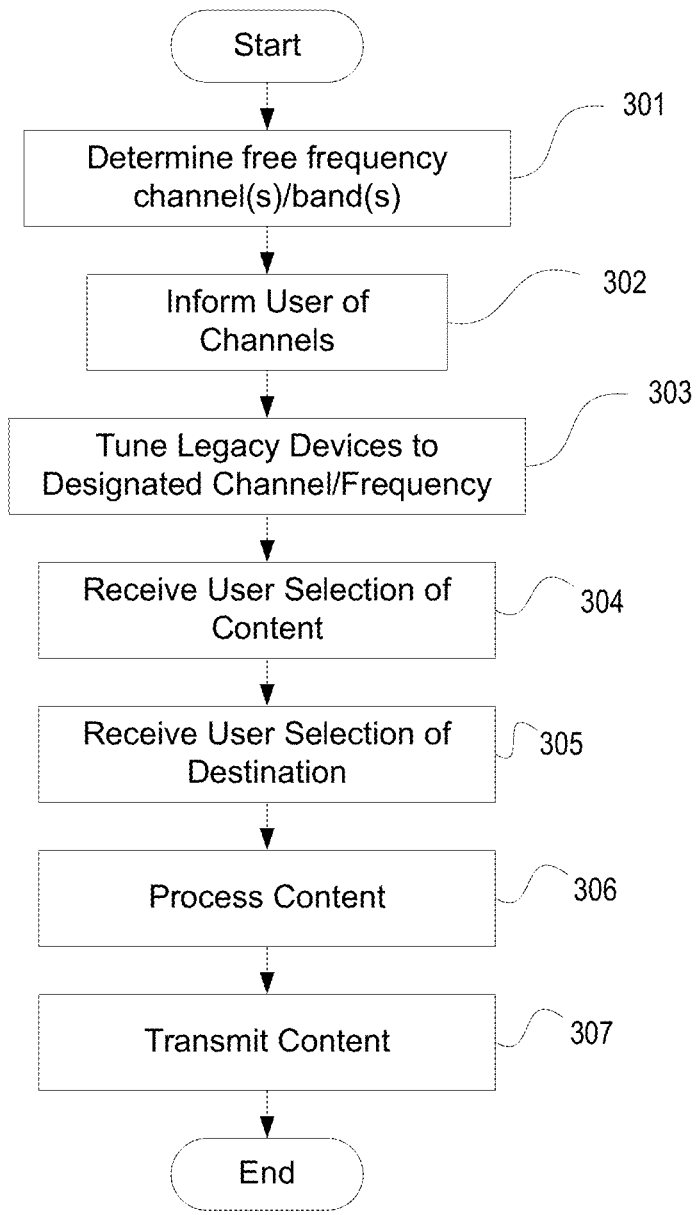
FIG. 3 illustrates an example process by which content can be transmitted.

FIG. 3 illustrates an example process by which a network in a premise may be used. In step 301, a device such as the gateway 202 may first determine what frequencies are available for use in and around the home. Different geographic areas may encounter different amounts of interference on different frequencies, so the step 301 determination may repeat, or change techniques, to find the frequencies that are relatively clear. This determination may be made in a variety of ways. One way may involve the transmitter 208 automatically scanning for available frequencies, or "whitespace" frequencies. The transmitter 208 may be a whitespace transmitter, and may sequentially step through a predefined list of possible frequencies (e.g., the various NTSC VHF/UHF channels, channels 2, 3, 4, etc.), listening to each to determine which frequencies have existing transmissions (e.g., signals above a minimum threshold of signal strength) and are in use in and around the home (e.g., in the vicinity of the home), and which frequencies are not in use (e.g., whitespace frequencies).

Another way this may be accomplished may involve configuration via computer 204. For example, a centralized database may be stored (e.g., at an external server on the Internet or a local network server) containing listings of geographic areas (e.g., ZIP codes) and frequency and/or channel usages for those areas (e.g., an NTSC or FCC listing of which areas have transmitters, and the frequencies and strengths of their transmissions). The user may inform the gateway 202 of its geographic area, and the gateway 202 may then consult such a database to determine which frequency or frequencies is/are clear enough for use in the home based on its location.

Figure 4:
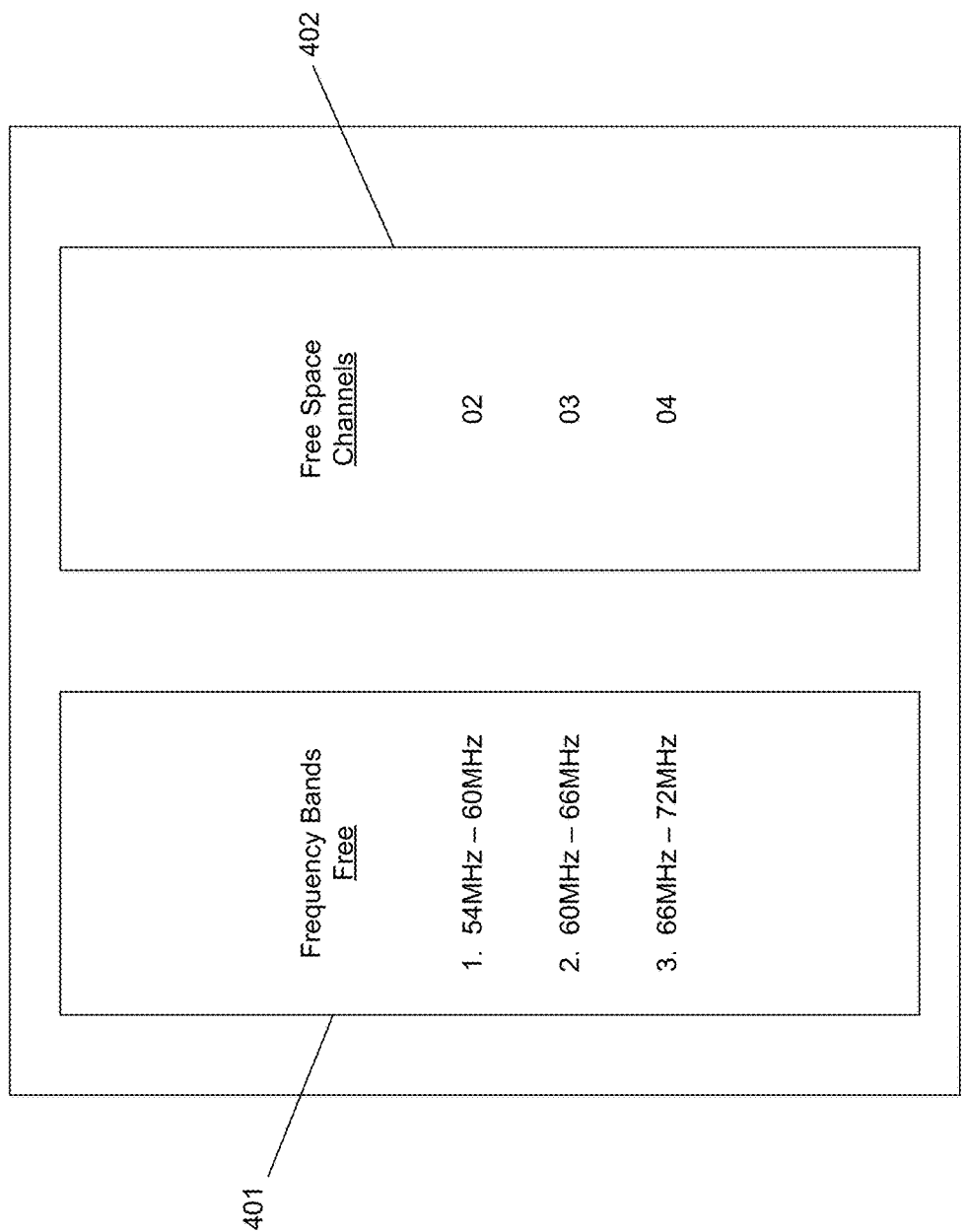
FIG. 4 illustrates an example display screen.

When the gateway 202 determines which frequencies are clear for use, the system can then proceed to step 302, and inform the user of the frequencies or channels that can be used to receive video from the gateway 202. This can be accomplished, for example, by displaying a listing on a computer 204, displaying it via other STBs, sending it to a handheld device or remote control (if the remote has a display and two-way communication ability). In some embodiments, this can be accomplished during initial setup of the gateway 202. FIG. 4 illustrates an example of such a display screen, and that will be discussed in more detail below.

In step 303, the user may then view and select from that list, and cause one or all of the legacy devices to tune to the selected channel to receive video from the gateway 202 (for example, via transmitter 208). For example, if NTSC channel 2 is available, then the user (or a device such as the gateway 202 or transceiver 208) can tune both legacy televisions 207a,b to NTSC channel 2, and can inform the gateway 202 of the match between that channel and those televisions. The gateway 202 may then use transmitter 208 to transmit legacy (e.g., NTSC) signals on NTSC channel 2, for reception by the legacy televisions 207a,b. These signals can carry any video, audio, or data content that is available to the gateway 202, and can also include video displays generated by the gateway 202, such as EPGs (electronic program guides) that a user can use to view and select available programming.

Figure 5A:
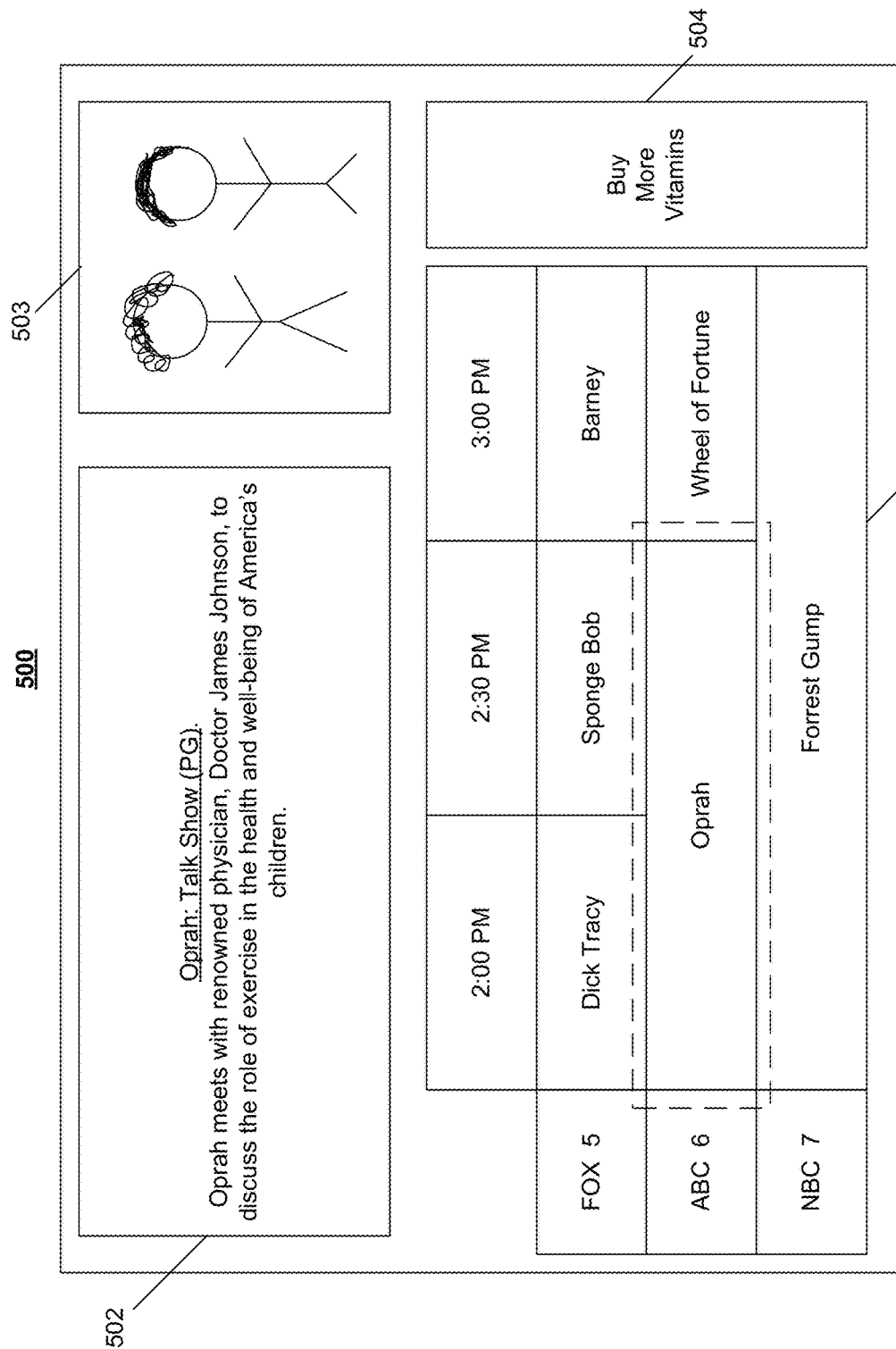
FIGS. 5A-5C illustrate examples of electronic programming guide (EPG) displays.
Figure 5B:
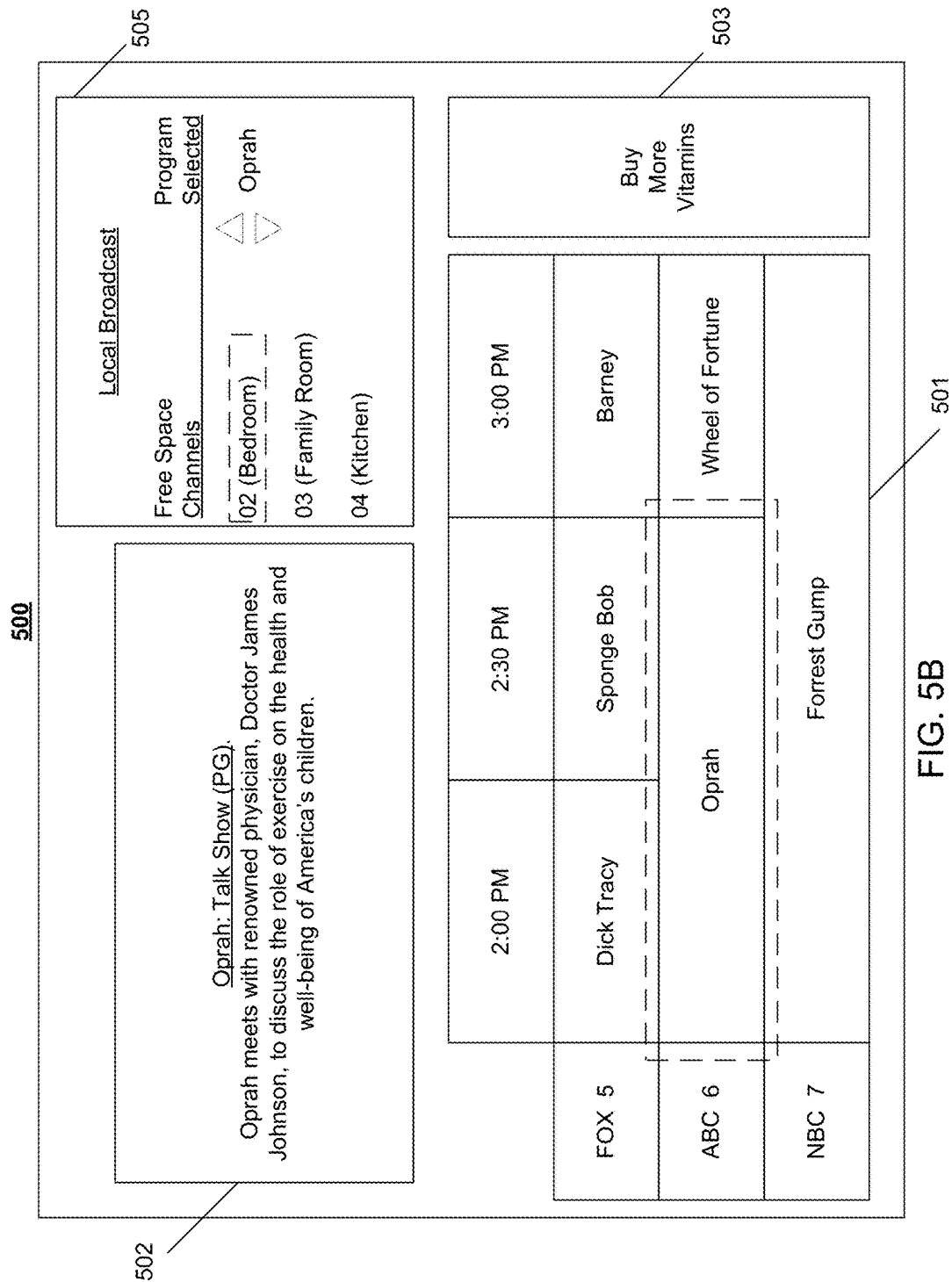
Figure 5C:
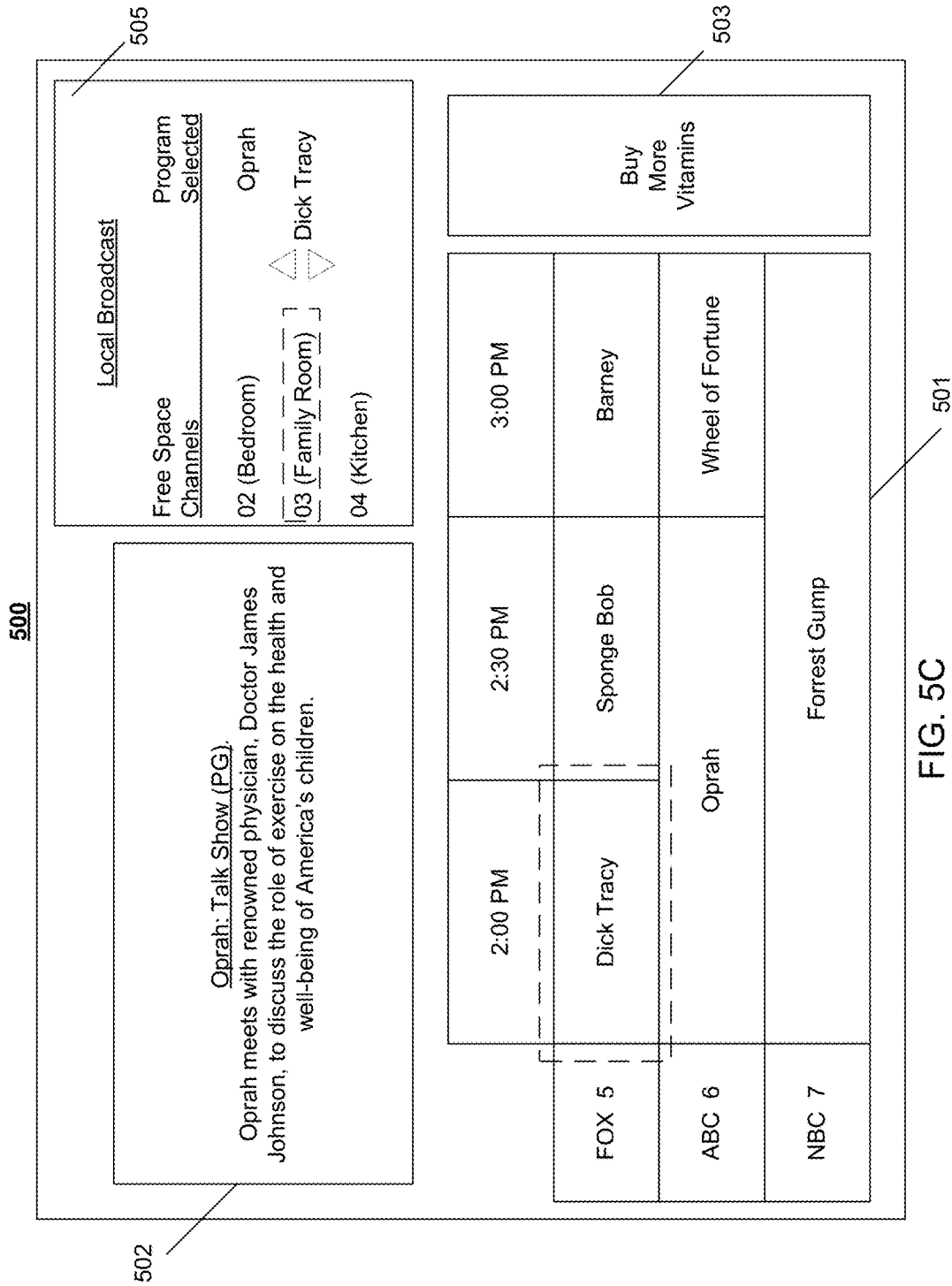

The televisions 207a,b may then be tuned, and the gateway 202 may be configured to maintain such a configuration, and the gateway 202 may also enable the televisions 207a,b to display content, such as audiovideo programs, EPG screens and other information, to users. The gateway 202 may receive user input from a wireless remote control, which may be a radio frequency remote that does not require a line-of-sight to the gateway 202. For example, a handheld remote may communicate through radio frequency transmission (e.g., in the UHF frequency range of 300 MHz-3 GHz, or VHF range of 30 MHz-300 MHz) to the transceiver 208. In this manner, the gateway 202 can cause EPG displays to appear on the legacy televisions 207a,b, and the user can interact with them by entering commands on a wireless remote control that can communicate back to the gateway 202. FIGS. 5A-C illustrate an example sequence of EPG screens, and those will be discussed in greater detail further below.

In step 304, the gateway 202 may receive a user selection of content to be delivered to a television or other display device. The selection may be made, for example, by the user choosing video content, e.g. a program from an EPG listing of available television shows, as illustrated in FIGS. 5A-C.

In step 305, the gateway 202 may receive a user selection of the target destination for the requested content. For example, the user may choose a particular program to be delivered to the bedroom television, or that it be aired on local channel 2 assigned to the bedroom television. Then, in step 306, the gateway 202 may request and/or obtain the content from the network 101, and may process the content to be in a format suitable for delivery to the target destination. This processing may be made based on the characteristics of the target device. For example, the gateway 202 may be preconfigured with parameters regarding the target device's characteristics (e.g., screen size, resolution, audio capabilities, etc.), and may process the incoming content to provide an output that matches the capabilities. The gateway 202 may also generate the appropriate modulation from transmitter 208 for reception by the target device, and then transmit that content in step 307. The receiving target device, which may be a legacy television, may then receive and tune/demodulate that signal for presentation to the user.

By the above process, legacy televisions 207a,b may still be used to receive content, even if the content is initially received at the home in a modulation or format that is incompatible with the television's original capabilities. The illustrated example is just an example, and the various steps and components described herein can be rearranged, combined, divided, omitted and/or modified as desired.

As noted above, FIG. 4 illustrates an example display screen listing the available unused channels at the home. FIG. 4 depicts a display, for example, displayed on a screen of computer 204 that may be used to present the frequency bands determined to be free by white space searching device, e.g., transceiver 208, as described above. In FIG. 4, three (3) bands are shown as free as presented in free band menu display 401, corresponding to frequency ranges: (1) 54 MHz-60 MHz, (2) 60 MHz-66 MHz, and (3) 66 MHz-72 MHz. The free bands displayed in conjunction with free band menu display 401 may be assigned free space channel numbers for ease of reference to the user (e.g., free space channels 02, 03 and 04, as shown in display 402 in the FIG. 4 example), and/or textual names (e.g., "Kitchen", "Family Room," (not shown) etc.).

This display may be used during the initial configuration of a particular display device or the gateway 202, when other aspects may be configured as well. For example, the user may provide data via the computer 204 to indicate the capabilities of the legacy televisions 207a,b. For example, the user could enter a model number of the television, and the gateway 202 may access an Internet database to retrieve information identifying the decoding, tuning, display, audio, etc. capabilities of that model of television. During the configuration, the user may also assign specific channels to specific televisions. So, for example, television 207a may be assigned channel 7, while television 207b may be assigned channel 9. The gateway 202 may then transmit different video signals on different channels, to direct different video content to different legacy televisions within the home.

FIGS. 5A-C illustrate how a user can select a program, for example, in conjunction with the method of FIG. 3. In FIG. 5A, an EPG screen 500 may be displayed on any display device, such as any of the televisions in the home, on a computer 204, on a display of the gateway 202, etc. The EPG 500 may include a grid 501 that provides a correlation between broadcast program channels (e.g., FOX 5, ABC 6, and NBC 7), programs (e.g., Dick Tracy, Sponge Bob, Barney, Oprah, Wheel of Fortune, and Forrest Gump), and previously scheduled transmission times (e.g., 2:00 PM, 2:30 PM, and 3:00 PM). Other content, such as on-demand or interactive content, may also be presented. The information presented in grid 501 may be scrolled (either automatically, or responsive to a user navigation command entered via a wireless remote control, for example) in order to advance the information displayed in EPG 500, and a corresponding update to the programs included in grid 501 may be made in response thereto.

The EPG screen 500 may include a descriptive material block 502. Descriptive material block 502 may be used to describe one or more programs included in EPG 500. For example, a user may navigate EPG 500 (and more specifically, a cursor in the grid 501) using a wireless remote control, for example. If the user places a cursor or otherwise settles on a program (e.g., Oprah, as denoted by the broken box around Oprah in grid 501), descriptive material block 502 may be updated to contain a description regarding the selected program. The description provided may include the genre the program belongs to (e.g., Talk Show), a parental rating associated with the program (e.g., PG—parental guidance suggested), and a brief description of the subject matter of the selected program.

The EPG screen 500 may include a trailer block 503. Trailer block 503 may be used to portray preview or sample images or audiovisual footage from a program highlighted in grid 501. Similar to descriptive material block 502, trailer block 503 may be updated responsive to a user navigating to a program in grid 501. Thus, continuing the above example, once a user settles on Oprah in grid 501, trailer block 503 may be updated to show a short scene or clip from the taped episode of Oprah that is being broadcast from 2:00 PM to 3:00 PM.

The EPG 500 may include other elements, such as an advertisement block 504. Advertisement block 504, the content of which may be generated locally by, e.g., gateway 202 or transceiver 208, or remotely by the provider, may be used to display or play one or more advertisements of one or more (commercial) sponsors. For example, as shown in FIG. 5A, an advertisement related to buying more vitamins may be presented or displayed in advertisement block 504. Alternative advertisements may be used, and the advertisements may be cycled as a function of time, in response to programs the user settles on while navigating grid 501, etc.

Turning to FIG. 5B, the user may choose to view the 'Oprah' program by, for example, navigating to it and pressing a "select" button on a wireless remote control. This may correspond to step 304 described above. In response to the selection, and as discussed above regarding step 305, the user may be prompted to identify a target device on which 'Oprah' should be displayed. This prompt, which can be a panel 505 of the EPG screen, can list available devices (e.g., the "Bedroom," "Family Room" and "Kitchen" devices listed in the panel 505) and/or free space channels (channels 2, 3 and 4 in the panel 505 example). The target device can be, for example, a legacy bedroom television, and the gateway can generate a local transmission or broadcast to transmit the 'Oprah' program content on the free space channel 2 associated with the bedroom television, and the user can tune that television to channel 2 to watch the program (as explained below). In some embodiments, the user can identify multiple free space channels and/or devices that are to receive the content, and the gateway 202 can cause the requested content to be locally broadcast (e.g., transmitted using transceiver 208) on multiple free channels in the vicinity of the user's home. The panel 505 may also allow the user to scroll up/down to view a listing of programs that have been selected for local broadcast. For example, if the user has chosen 'Oprah' for the bedroom, and 'Evening News' for the family room, the user can scroll up/down through a list of those two programs.

In response to the selection, and as described above, the gateway 202 may then transmit a request for the program to an external server (if needed), receive and decode the requested content, format it for the target device, and transmit it using the local whitespace channel for reception at the desired target device. If multiple targets are chosen, then the program may be broadcast on multiple channels, allowing each target television 207a,b to receive its own stream of the program. Viewers at the televisions 207a,b may use remote controls to individually issue trickplay commands to pause, rewind, fast-forward, etc. through the content. The viewers can do this with different remote controls, and the various remote controls may each transmit, along with the commands, an identification of the particular television 207a,b being controlled, so that their selections and/or commands may be interpreted at the gateway to only apply to the content being transmitted for the identified television. Alternatively, or additionally, the remote controls may be initialized to correspond with televisions 207a,b, and identification of the remote may automatically identify the corresponding television as well. The trickplay commands may be processed by the gateway 202, which can transmit trickplay versions of the content as desired (for example, by obtaining it from an upstream source as needed).

FIG. 5C illustrates another display screen, in which the user has chosen the "Dick Tracy" program for local broadcast to the Family Room television, while the previously-selected "Oprah" program is sent to the Bedroom television. In response to those selections, the gateway 202 may have transmitter 208 transmit these programs on different local frequencies, for reception at the identified televisions. For example, the "Oprah" program may be placed on channel 2, while the "Dick Tracy" program can be placed on channel 3.

In the above example, the gateway 202 is informed as to the target device. In alternative embodiments, the gateway 202 may be indifferent as to the specific target device. For example, the user may choose a program (e.g., "Oprah"), and may simply choose to have that program locally broadcast on any or all whitespace channels identified by the gateway 202 or transmitter 208. The gateway 202 can then simply broadcast the program on the whitespace channels, without receiving information identifying the actual device that will be receiving it.

In the above example, the EPG screen 500 is described as being displayed on the target device (e.g., television 207a). In alternative embodiments, the EPG 500 can be displayed on any other device that is able to communicate with the gateway 202. For example, the EPG screen 500 can be displayed on a computer 204, so that a user could use a laptop to choose which show(s) will be "aired" in his/her home. The screen could also be displayed on a wireless remote control in the home, allowing a user to select a program for viewing without requiring even turning on the television first. In some embodiments, the remote control can move from room-to-room, and the gateway can automatically (or, in response to a user command indicating the change in room) change its transmission frequency to allow the user's program to be received on a different television in the new room.

In the example above, the target televisions 207a,b are analog television sets tuned to NTSC channels 2 and 3 respectively to receive programming that was transmitted to the premises in a different format and/or modulation (e.g., MPEG2 stream via IP). As an alternative, the receiving devices 207a,b may be of a different type. For example, the receiving device may be a mobile television device configured to receive ATSC-M/H (Advanced Television Systems Committee—Mobile/Handheld) signals, and the transmitter (or transceiver) 208 may be configured to transmit such signals. Other mobile formats, such as DVB-H (Digital Video Broadcasting—Handheld, ETSI EN 302 304), may also be used. In some embodiments, the mobile device can initially communicate with another device, such as a gateway or set-top box, to request and receive authorization for the display of requested content. Through this authorization, the mobile device can be registered with the gateway/STB, and can receive various subscription-based services that are accessible by the gateway/STB.

Figure 6:
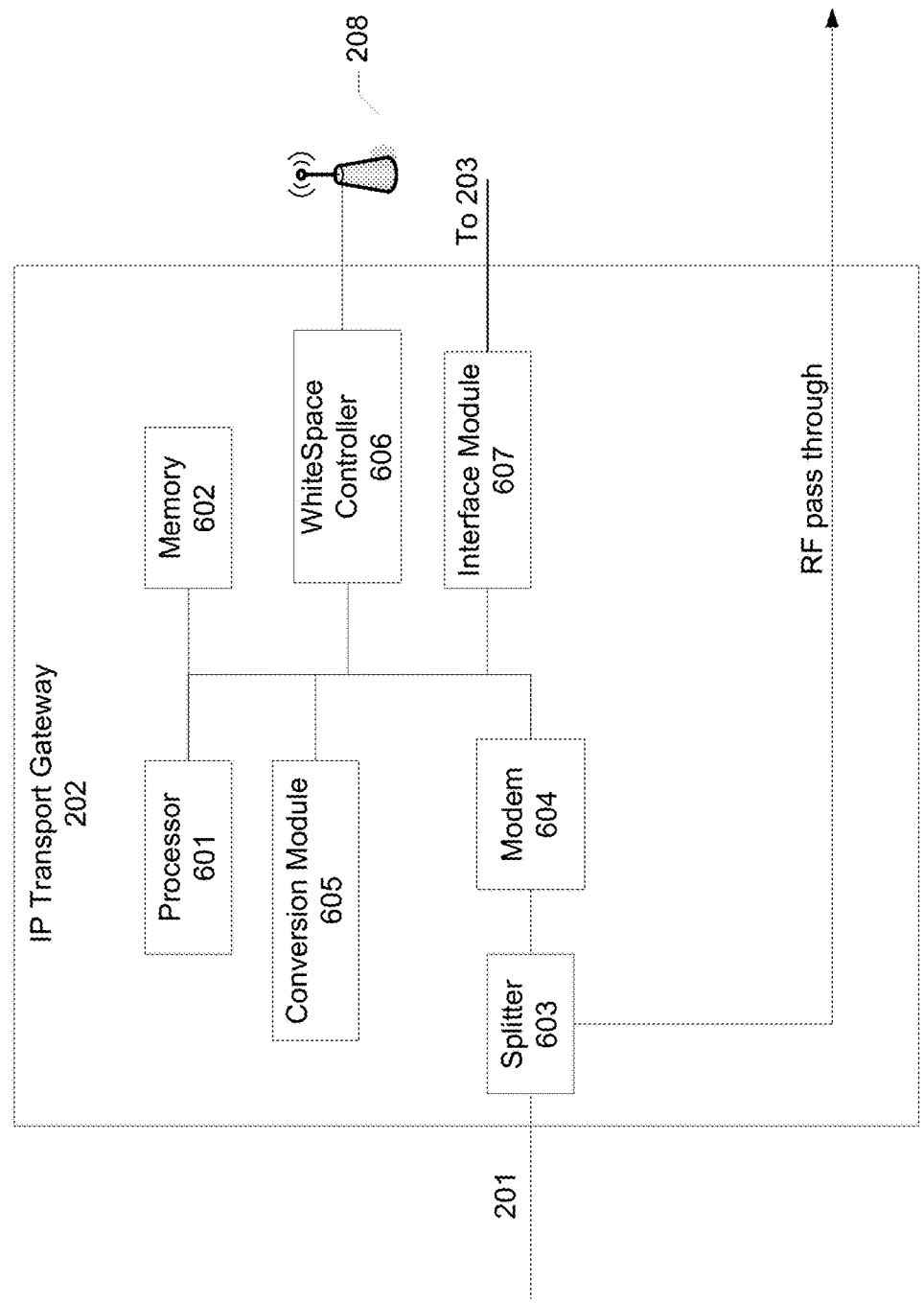
FIG. 6 illustrates an example computing device, such as a transport gateway.

FIG. 6 illustrates an example gateway 202, which is an IP transport gateway. The gateway 202 may include a processor 601, which can control the operation of the gateway 202 to perform any of the functions and features described herein. Those and other functions and features may be provided as software instructions (e.g., computer code) stored in a computer-readable memory 602, which can be any desired type of storage or medium (e.g., hard disk, FLASH drive, RAM, ROM, optical disk, floppy disk, etc.).

The gateway 202 may receive an input 201, and may have a splitter 603 to initially split the incoming signal to provide, for example, an RF bypass copy of the incoming signal. The splitter 603 may also include filtering circuitry to provide cleaner signals, such as removing upstream components emanating from the gateway 202 so that the components do not propagate back down into the RF bypass signal.

The gateway 202 may include a modem 604, which, if implemented in an HFC system, may be a DOCSIS cable modem. The modem 604 may be configured to demodulate, process and buffer incoming signals from the external network 101, and to do the reverse for upstream outgoing signals.

The gateway 202 may also include a conversion module 605. The conversion module 605 may be a processor configured to reformat audio and/or video content. For example, if an incoming video program is in high-definition format, but needs to be transmitted as a standard definition analog signal, the content processor 605 may handle that conversion, to allow transmitter 208 to transmit HD content (e.g., content at 720p, 1080i, 1080p resolutions) formatted for reception on a UHF or VHF channel. Or, if incoming video is in an MPEG-4 format, and a different encoding format is needed, the conversion module 605 may be configured to convert between the encoding formats.

The gateway 202 may also include a whitespace controller 606. The whitespace controller 606 may include processing circuitry configured to control the transmitter 208. For example, the controller 606 may perform necessary processing to formulate the NTSC channel 2 signal carrying video content from the conversion module 605. The controller 606 may also handle the process of locating relatively unused frequencies in the home's vicinity.

The gateway 202 may also include an interface module 607 for a communication network of the home. For example, the home may use a MoCA network to distribute data throughout the home using the home's existing coaxial cable network, according to the MoCA standard. In that situation, the interface module 607 may be a MoCA interface module and include interface circuitry and/or software to process communications using the MoCA standard.

Although not required, various aspects described herein may be embodied as a method, a data processing system, or as a computer-readable medium storing computer-executable instructions. Accordingly, those aspects may take the form of an entirely hardware embodiment, an entirely software embodiment, an entirely firmware embodiment, or an embodiment combining software, firmware and hardware aspects. The functionality may be resident in a single computing device, or may be distributed across multiple computing devices/platforms, the multiple computing devices/platforms optionally being connected to one another via one or more computing networks. In addition, various signals representing data or events as described herein may be transferred between a source and a destination in the form of electromagnetic waves traveling through signal-conducting media such as metal wires, optical fibers, and/or wireless transmission media (e.g., air and/or space).

As described herein, the various methods and acts may be operative across one or more computing servers and one or more computing networks. The functionality may be distributed in any manner, or may be located in a single computing device (e.g., a server, a client computer, etc.). As discussed herein, real-time (or substantially real-time) access to programming and programming related information may be obtained across various televisions, computers and the like. Moreover, while described in the context of television signals being transmitted in unoccupied/unpopulated/free frequency spectrum, the techniques described herein may be adapted to accommodate the transmission of other types of signals without departing from the spirit and scope of the disclosure.

As described herein, the methodological acts and processes may be tied to particular machines or apparatuses. For example, as described herein, a white space device and a mobile transmitter device may be used in various embodiments of this disclosure. More generally, one or more computers may include one or more processors and memory storing instructions, that when executed, perform the methodological acts and processes described herein. Furthermore, the methodological acts and processes described herein may perform a variety of functions including transforming an article (e.g., a television signal) into a different state or thing (e.g., an NTSC or mobile TV signal).

The various embodiments and examples described above are, as stated, merely examples. Many variations may be implemented to suit a particular implementation, and the various features may be combined, divided, rearranged, omitted and/or augmented as desired. The scope of this patent should not be limited by any of the specific examples described herein.

What is claimed is:

1. A method comprising:
   determining, by a computing device, a plurality of available wireless frequencies;
   determining a frequency usage comprising determining that a first wireless frequency of the plurality of available wireless frequencies is used less than a second wireless frequency of the plurality of available wireless frequencies;
   assigning, based on user input on a handheld device and based on the frequency usage, a user device to the first wireless frequency of the plurality of available wireless frequencies, wherein the user input on the handheld device indicates a user customized name, and the user customized name corresponds to the first wireless frequency;
   instructing the user device to receive data via the first wireless frequency;
   receiving data corresponding to the user device; and
   transmitting, to the user device and via the first wireless frequency, the data, wherein the data is configured according to audio capabilities of the user device.

2. The method of claim 1, further comprising converting the data to a format corresponding to a screen size and a resolution of the user device.

3. The method of claim 1, wherein determining the plurality of available wireless frequencies comprises scanning each frequency of a predetermined list of wireless frequencies.

4. The method of claim 1, wherein determining the plurality of available wireless frequencies comprises:
   receiving a location; and
   querying, based on the location, a database for the plurality of available wireless frequencies.

5. The method of claim 1, wherein determining the plurality of available wireless frequencies comprises:
   receiving a location;
   querying, based on the location, a database for a list of available wireless frequencies; and
   scanning each frequency of the list of available wireless frequencies.

6. The method of claim 1, wherein assigning the user device to the first wireless frequency comprises receiving a user confirmation of the first wireless frequency.

7. The method of claim 6, further comprising:
   displaying a listing of the plurality of available wireless frequencies; and
   receiving, via the listing, the user confirmation of the first wireless frequency.

8. A system comprising:
   a first computing device and a second computing device;
   wherein the first computing device comprises:
      one or more processors; and
      memory storing instructions that, when executed by the one or more processors of the first computing device, cause the first computing device to:
         determine a plurality of available wireless frequencies;
         determine that a first wireless frequency of the plurality of available wireless frequencies is used less than a second wireless frequency of the plurality of available wireless frequencies;
         assign, based on user input on a handheld device, the second computing device to the first wireless frequency of the plurality of available wireless frequencies, wherein the user input on the handheld device indicates a user customized name that corresponds to the first wireless frequency;
         instruct the second computing device to receive data via the first wireless frequency;
         receive data corresponding to the second computing device; and transmit, to the second computing device and via the first wireless frequency, the data; and wherein the second computing device comprises:
one or more processors; and
memory storing instructions that, when executed by the one or more processors of the second computing device, cause the second computing device to receive, via the first wireless frequency, the data.

9. The system of claim 8, wherein the instructions in the memory of the first computing device, when executed by the one or more processors of the first computing device, cause the first computing device to convert the data to a format corresponding to a screen size and a resolution of the second computing device.

10. The system of claim 8, wherein the instructions in the memory of the first computing device, when executed by the one or more processors of the first computing device, cause the first computing device to:
receive a location; and
query, based on the location, a database for the plurality of available wireless frequencies.

11. The system of claim 8, wherein the instructions in the memory of the first computing device, when executed by the one or more processors of the first computing device, cause the first computing device to output an instruction to configure the second computing device to use the first wireless frequency.

12. The system of claim 8, wherein the instructions in the memory of the first computing device, when executed by the one or more processors of the first computing device, cause the first computing device to:
output the plurality of available wireless frequencies; and
receive a selection of the first wireless frequency.

13. The system of claim 8, wherein the instructions in the memory of the first computing device, when executed by the one or more processors of the first computing device, cause the first computing device to:
receive a location;
transmit an indicator of the location; and
receive, in response to the location, the plurality of available wireless frequencies.

14. The system of claim 8, wherein the instructions in the memory of the first computing device, when executed by the one or more processors of the first computing device, cause the first computing device to assign a group of devices to a same wireless frequency of the plurality of available wireless frequencies.

15. An apparatus comprising:
one or more processors, and
memory storing machine-readable instructions, that, when executed by the one or more processors, cause the apparatus to:
determine a location of the apparatus;
determine, based on the location, a plurality of available wireless frequencies;
determine a frequency usage comprising determining that a first wireless frequency of the plurality of available wireless frequencies is used less than a second wireless frequency of the plurality of available wireless frequencies;
allocate, based on user input on a handheld device and the frequency usage, the first wireless frequency of the plurality of available wireless frequencies to one or more user devices, wherein the user input on the handheld device indicates a user customized name comprising letters, and the user customized name corresponds to the first wireless frequency;
cause the one or more user devices to receive data via the first wireless frequency;
receive data corresponding to the one or more user devices; and
transmit, to the one or more user devices and via the first wireless frequency, the data.

16. The apparatus of claim 15, wherein the instructions, when executed by the one or more processors, cause the apparatus to retrieve, from a database, the plurality of available wireless frequencies.

17. The apparatus of claim 15, wherein the instructions, when executed by the one or more processors, cause the apparatus to:
transmit an indicator of the location; and
receive, in response to the location, the plurality of available wireless frequencies.

18. The apparatus of claim 15, wherein the instructions, when executed by the one or more processors, cause the apparatus to convert the data to a format corresponding to a screen size and a resolution of the one or more user devices.

19. The apparatus of claim 15, wherein the instructions, when executed by the one or more processors, cause the apparatus to receive input indicating the location.

20. The apparatus of claim 15, wherein the instructions, when executed by the one or more processors, cause the apparatus to scan a wireless frequency range to determine the plurality of available wireless frequencies.

* * * * *